United States Patent

[11] 3,557,923

[72] Inventor Claude H. Nickell
Dearborn, Mich.
[21] Appl. No. 828,175
[22] Filed May 27, 1969
[45] Patented Jan. 26, 1971
[73] Assignee Ford Motor Company
Dearborn, Mich.
a corporation of Delaware

[54] MULTIPLE DISC CLUTCH WITH CUSHIONED ENGAGEMENT
4 Claims, 3 Drawing Figs.

[52] U.S. Cl. .................................................... 192/70.14,
192/70.2, 192/70.28, 192/70.3, 192/106.2
[51] Int. Cl. ...................................................... F16d 13/54
[50] Field of Search ........................................ 192/70.14,
70.17, 70.2, 70.28, 70.29, 70.3

[56] References Cited
UNITED STATES PATENTS
1,513,203 10/1924 Wemp ............................ 192/70.29X

| | | | |
|---|---|---|---|
| 2,036,005 | 3/1936 | Wemp ............................ | 192/70.28X |
| 2,794,526 | 6/1957 | Canfield ......................... | 192/70.14X |
| 2,985,273 | 5/1961 | Binder ............................ | 192/70.14 |
| 3,249,189 | 5/1966 | Schjolin et al. ................ | 192/70.28X |

Primary Examiner—Benjamin W. Wyche
Attorneys—John R. Faulkner and Donald J. Harrington ABSTRACT: A neutral clutch mechanism for a power transmission mechanism in an automotive vehicle driveline comprising a pair of friction clutch discs carried by a common clutch hub, a primary pressure plate disposed at one side of one of the clutch discs, the engine flywheel being on one side of the other clutch disc, a secondary pressure plate between the clutch discs, the pressure plates on the flywheel having a predetermined clearance therebetween which is maintained by spring elements carried by the auxiliary pressure plate, and an axial linkage with a relatively high mechanical advantage for actuating the pressure plates.

PATENTED JAN 26 1971

INVENTOR:
CLAUDE H. NICKELL
ATTORNEYS

MULTIPLE DISC CLUTCH WITH CUSHIONED ENGAGEMENT

GENERAL DESCRIPTION OF THE INVENTION

In a manually operated power transmission mechanism for use with an internal combustion engine in an automotive vehicle driveline, it is necessary to establish and disestablish a driving connection between the engine crankshaft and the power input gear element of the transmission. For this purpose, it is usual practice to use a clutch assembly including a friction disc which may be splined to the power input shaft. The disc is connected drivably to the power input gear of the transmission. A pressure plate engages the friction disc and establishes a driving connection between it and the engine flywheel, which in turn is connected to the engine crankshaft. The pressure plate, in turn, is carried by a clutch cover assembly which provides fulcrum supports for an actuator mechanism for the pressure plate.

The torque capacity for a friction clutch of this type is related to the operating radius of the clutch disc and to its friction characteristics, as well as the clutch actuating forces. Pressure is applied to the pressure plate through compression springs, thereby establishing the necessary torque capacity for any given driveline installation.

In my improved clutch structure I use two clutch discs thereby permitting a reduction in the operating radius of the disc assembly for a given torque capacity. This makes it possible to reduce the transverse dimensions of the transmission structure itself, thus avoiding interference problems in vehicle installations where the vehicle profile is relatively low. A common hub and damper spring assembly is used for each of the discs in the double clutch disc assembly.

My invention is characterized also by its reduced clutch actuating forces. Operating levers for the pressure plates are connected mechanically to a driver-operated foot pedal. The pedal effort is reduced substantially by reason of the increased mechanical advantage that is made possible in my improved mechanism.

The clutch discs are maintained in predetermined, spaced relationship with respect to the engine flywheel and with respect to a primary pressure plate by separator springs carried by a secondary pressure plate. No relative motion relative to the separator springs is required of the engine flywheel, nor the primary pressure plate nor the secondary pressure plate since the flywheel and each of the pressure plates form a part of a common rotating assembly.

My invention is an improvement in certain tandem clutch structures known in the art, such as those described in U.S. Pat. Nos. 3,305,060; 1,700,244; 1,881,127 and 3,174,602.

BRIEF DESCRIPTION OF THE FIGURES OF THE DRAWINGS

FIG. 1 is taken along the plane of section line 1–1 of FIG. 2.

PARTICULAR DESCRIPTION OF THE INVENTION

Figure 1:
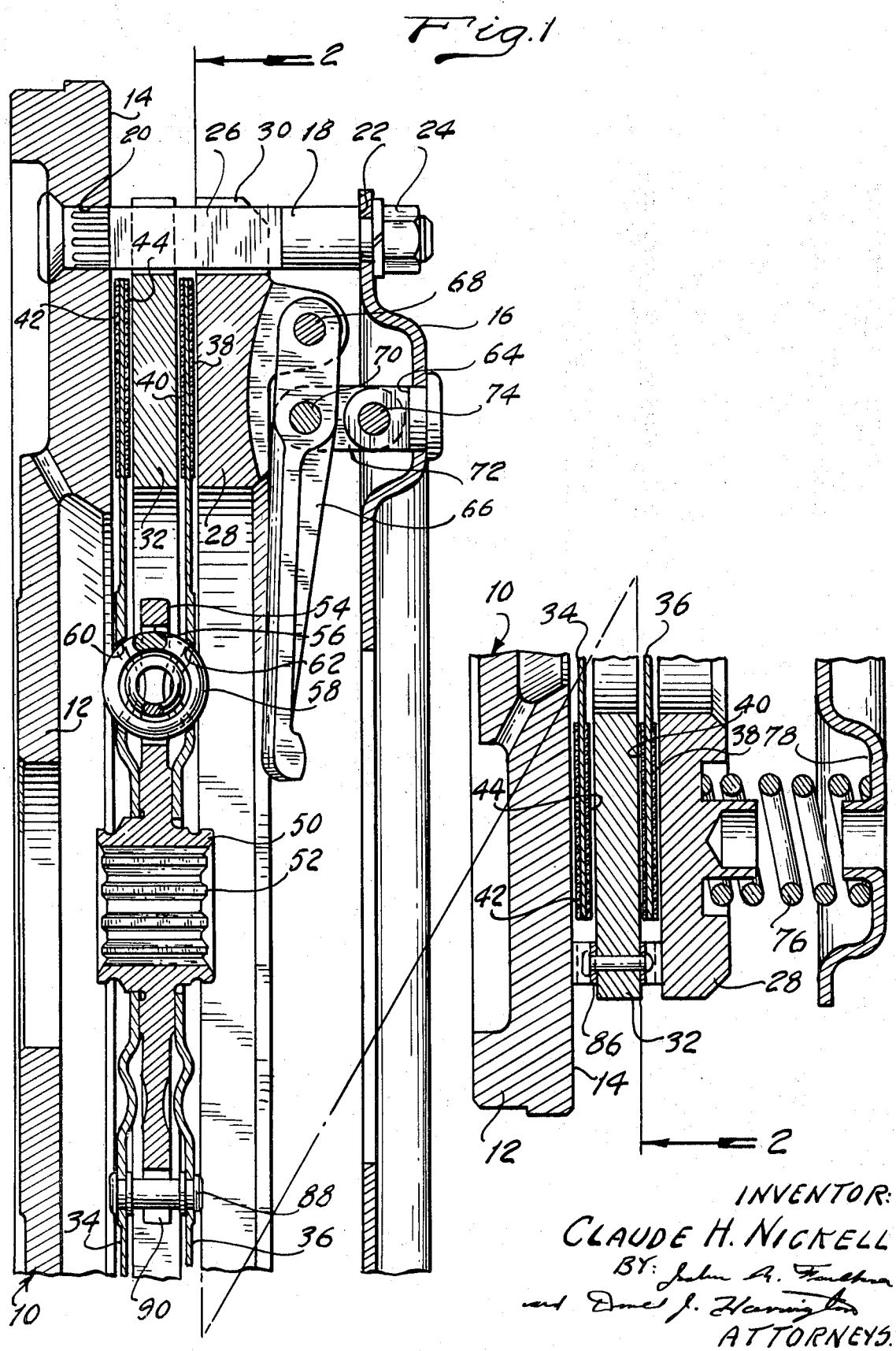
FIG. 1 shows in longitudinal cross-sectional form a friction clutch assembly embodying the improvements of my invention.

In FIG. 1, numeral 10 designates generally a flywheel for an internal combustion engine, not shown. It includes a hub 12 that may be bolted to the end of the crankshaft. It includes also a friction surface 14 formed on a radially outward region of the flywheel. A cover plate 16 is supported by three drive pins 18, which extend axially. Each drive pin 18 is secured by means of a press fit within a cooperating opening 20 formed in the flywheel 10. The plate 16 is carried by the pins 18 and is held axially fast against a reaction shoulder 22. The pins 18 are threaded to accommodate clamping nuts 24.

The intermediate sections of the drive pins 18 are formed of a square cross section as indicated at 26. A primary pressure plate 28 is positioned between the flywheel 10 and the cover plate 16. It is formed with square, peripheral recesses 30 which register with the square pin sections 26. The pressure plate 28 thus is held with a three-point support by the pins 18.

A secondary pressure plate 32 is positioned between the discs, which are identified by reference characters 34 and 36. The outer margin of the pressure plate 32 is formed with square recesses through which the intermediate sections 26 of the mounting pins 18 are received. The plate 32 thus is held with a three point support.

Clutch disc 36 is formed on either side thereof with friction pads 38 and 40. These pads are located near the outer margin of the disc. Similarly, clutch disc 34 is formed with friction pads 42 and 44 located at its outer margin.

Figure 2:
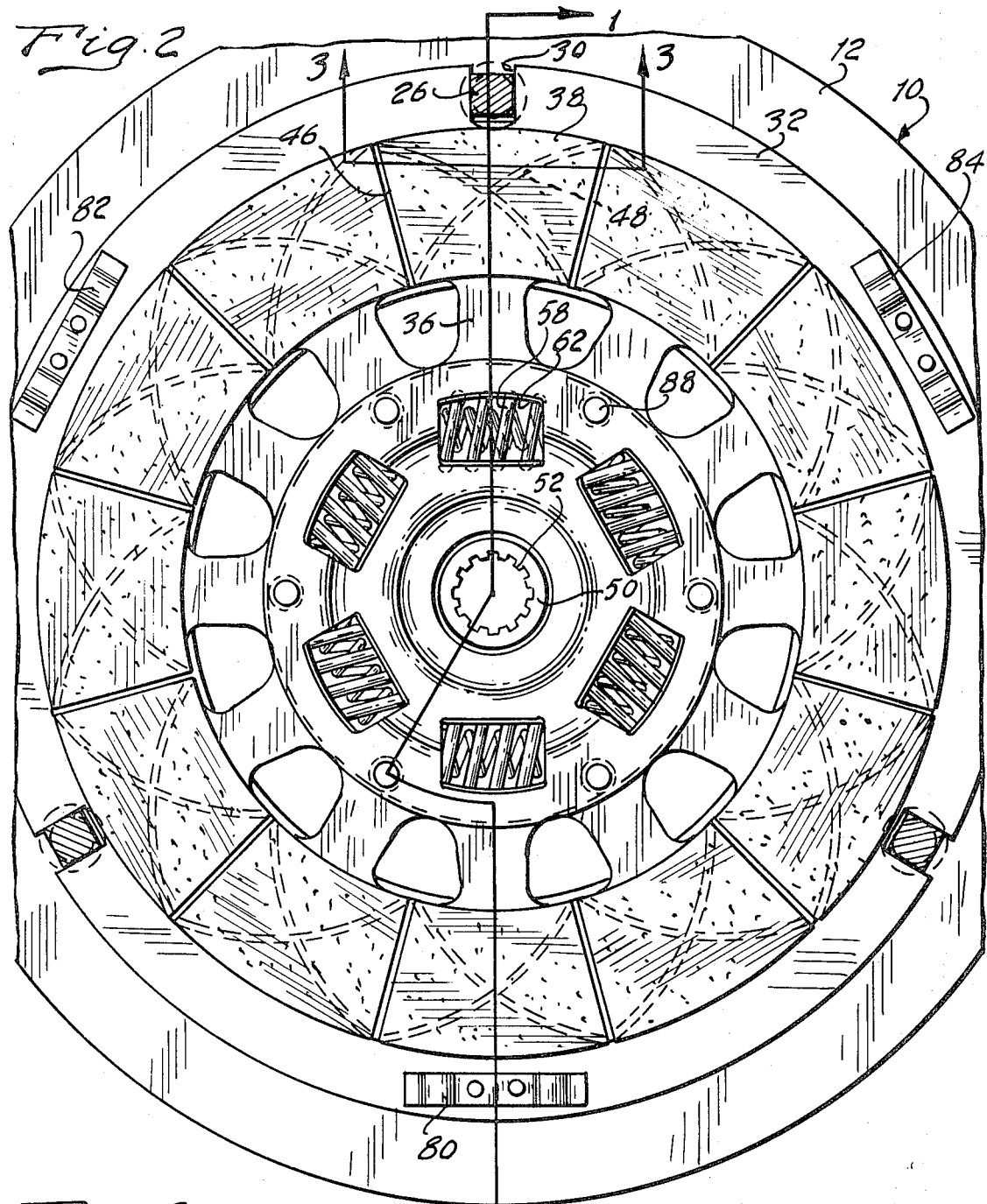
FIG. 2 is an end elevation view of the structure of FIG. 1.
Figure 3:
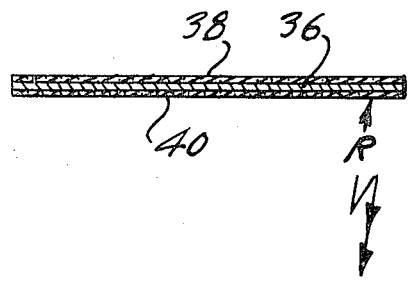
FIG. 3 is a partial cross-sectional view taken along the plane of section line 3–3 of FIG. 2.

The discs are formed with radial slots as indicated at 46 in FIG. 2, thereby forming peripheral segments. Each peripheral segment is dished, as indicated in FIG. 3, so that the surface of the friction material assumes a curvature having a radius R.

In a preferred embodiment of my invention, the radius R is about 40 inches. The displacement of the ends of the segments with respect to their centers may be .010 to .012 inches. After the friction material is applied to the disc segments, the friction material is grooved as indicated in FIG. 2 at 48, to accommodate flow of lubricating oil across the friction surfaces.

The clutch hub is shown at 50, and it is formed with internal splines 52 which register with external splines formed on the power input shaft for the power transmission mechanism. The hub 50 includes a radially extending disc 54 having apertures 56 which receive damper springs 58. The inner portions of the discs 34 and 36 straddle the disc 54. These inner disc portions are formed with apertures 60 and 62, respectively, which receive the springs 58. The springs 58 are pretensioned, thereby providing a resilient connection between the hub 50 and each of the discs 34 and 36.

A clutch cover plate 16 is provided with multiple anchor pins 64, which are welded to the cover plate 16. An actuator lever 66 is pinned to the primary pressure plate 28, as shown at 68. It is pinned also at 70 to a link 72, which in turn is pinned at 74 to the anchor pin 64.

A plurality of springs 76 act upon the pressure plate 28. They are seated in spring wells 78 located in the cover plate 16. The clutch applying pressure of the springs 76 can be overcome by applying a clutch release force to the radially inward end of the levers 66 by means of a clutch throwout bearing, not shown. When the force on the levers 66 is relived, the springs 76 engage the clutch by shifting the pressure plates 28 and 32 into engagement with the friction discs thereby connecting drivably the hub 50 to the flywheel 10.

Several leaf springs, preferably three in number, are situated on each side of the pressure plate 32. The springs are indicated by reference characters 80, 82 and 84 in FIG. 2. A similar set of leaf springs is provided on the opposite side of the pressure plate 32, one of these additional springs is shown in FIG. 1 at 86. The leaf springs are located near the outer margin of the pressure plate 32, and they act directly against the flywheel 10 and the pressure plate 28. The flywheel and each of the pressure plates, of course, rotate in unison although the pressure plates are adapted to shift axially along the drive pins 18. The desired spacing of the pressure plates with respect to the discs thus is maintained at all times, hereby reducing the frictional drag to a minimum when the clutch is disengaged.

When the springs 76 apply the clutch, the dishing of the clutch segments permits a cushioning action to occur. This eliminates harsh clutch engagement and torsional vibrations that normally occur in clutch structures of this type. Because of the double clutch disc arrangement, it is possible to reduce the diameter of the clutch structure without reducing its capacity when it is compared with a single clutch structure of comparable capacity. Furthermore, the three point support provided by the drive pins 18 and the minimum clearance maintained between the clutch discs themselves when the clutch is disengaged permit a minimum amount of travel for the clutch lever 66. Since this travel is reduced, it is possible to increase the overall mechanical advantage of the linkage system that connects the driver operated foot pedal and the clutch throwout bearing. This, of course, reduces the pedal effort required by the operator to control the clutch.

To compensate for wear of the clutch disc friction material, the clutch throwout bearing can be adjusted to maintain the predetermined clearance needed to effect clutch disengagement.

Although a resilient connection is established between the clutch hub 50 and the discs 34 and 36, a positive connection therebetween also is provided by pins 88 as the springs 58 yield to their limiting, compressed position. These pins are received within radial recesses 90 formed in the margin of the disc 54. The pins 88 serve to join together the two discs 34 and 36 to form a tandem clutch disc assembly.

I claim:

1. In an automotive vehicle transmission structure adapted to deliver torque from a vehicle engine to a transmission power input shaft, a friction disc clutch structure comprising a flywheel adapted to be connected to an engine crankshaft, a cover plate situated in spaced disposition with respect to the flywheel, a clutch hub adapted to be connected to said power input shaft, said hub comprising a radial disc, a pair of friction discs, the radially inward portions of said friction discs straddling said hub disc, a resilient damper spring connection between said hub disc and said inner disc portions, the radially outward portions of said discs being slotted to form a plurality of disc segments, friction material formed on each side of said disc segments, said disc segments being formed with a curvature, when viewed from a radial direction, to establish cushioned engagement of said clutch structure, drive pins connecting together said cover plate and said flywheel and establishing a rigid assembly, a primary pressure plate and a secondary pressure plate, openings formed in the outer regions of said pressure plates through which said drive pins are received thereby supporting said drive plates on said drive pins, one of said friction discs being disposed between said pressure plates and the other of said friction discs being disposed between said secondary pressure plate and said flywheel, spring elements secured to each radial face of said secondary pressure plate thereby establishing a predetermined clearance between said secondary pressure plate and the adjacent surfaces of said flywheel and said primary pressure plate, compression springs disposed between said cover plate and said primary pressure plate thereby tending normally to engage said clutch structure by establishing a frictional driving connection between said hub and said pressure plates and between said hub and said flywheel, and clutch release lever means including portions pivoted on said primary pressure plate and on said cover plate for relieving the spring force of said springs.

2. The combination as set forth in claim 1 wherein said drive pins include an intermediate region of a cross section that defines two radial surfaces, the openings in said pressure plates having two side surfaces that register with said radial surfaces thereby permitting torque transfer between said drive pins and said pressure plates while permitting axial shifting movement of the latter.

3. The combination as set forth in claim 1 wherein said spring elements comprise springs secured at angularly spaced locations on each side of said secondary pressure plate thereby establishing a continuous separating spring force which tends to maintain a minimum clearance between said flywheel and said secondary pressure plate and between said secondary pressure plate and said primary pressure plate when said clutch structure is disengaged.

4. The combination as set forth in claim 2 wherein said spring elements comprise springs secured at angularly spaced locations on each side of said secondary pressure plate thereby establishing a continuous separating spring force which tends to maintain a minimum clearance between said flywheel and said secondary pressure plate and between said secondary pressure plate and said primary pressure plate when said clutch structure is disengaged.